United States Patent
Bae (10) Patent No.: US 10,432,800 B1
(45) Date of Patent: Oct. 1, 2019

(54) APPARATUS AND METHOD FOR MANAGING THREE-DIMENSIONAL PRINTING

(71) Applicant: ELECTRONICS AND TELECOMMUNICATIONS RESEARCH INSTITUTE, Daejeon (KR)

(72) Inventor: Hee Chul Bae, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/989,579

(22) Filed: May 25, 2018

(30) Foreign Application Priority Data

May 3, 2018 (KR) .................. 10-2018-0051076

(51) Int. Cl.
| | |
|---|---|
| *G06F 3/12* | (2006.01) |
| *H04N 1/00* | (2006.01) |
| *B29C 64/393* | (2017.01) |
| *G06T 1/00* | (2006.01) |
| *B33Y 50/02* | (2015.01) |

(52) U.S. Cl.
CPC ....... *H04N 1/00037* (2013.01); *B29C 64/393* (2017.08); *B33Y 50/02* (2014.12); *G06T 1/0014* (2013.01); *H04N 1/00087* (2013.01); *H04N 1/00251* (2013.01); *H04N 1/00649* (2013.01)

(58) Field of Classification Search
CPC ........... H04N 1/00037; H04N 1/00087; H04N 1/00251; H04N 1/00649; B33Y 50/02; B29C 64/393; B29C 67/0081; B29C 67/0085; G06T 1/0014
USPC ........................................ 358/1.14
See application file for complete search history.

(56) References Cited

U.S. PATENT DOCUMENTS

| | | | |
|---|---|---|---|
| 9,507,555 B2 | 11/2016 | Liu et al. | |
| 9,514,397 B2 | 12/2016 | Peek | |
| 9,846,804 B2 | 12/2017 | Lim et al. | |
| 2011/0109731 A1* | 5/2011 | Koo ..................... | H04N 13/128 348/51 |
| 2011/0211042 A1* | 9/2011 | Thorpe ................... | G06T 7/97 348/43 |
| 2015/0084951 A1* | 3/2015 | Boivin .................. | H04N 5/272 345/419 |

(Continued)

FOREIGN PATENT DOCUMENTS

| | | |
|---|---|---|
| KR | 10-1247560 B1 | 3/2013 |
| KR | 10-2016-0070477 A | 6/2016 |
| KR | 10-2017-0060496 A | 6/2017 |

(Continued)

*Primary Examiner* — Gabriel I Garcia
(74) *Attorney, Agent, or Firm* — LRK Patent Law Firm (57) ABSTRACT

An apparatus and method for managing three-dimensional (3D) printing. The method includes receiving a video of a product being output from a 3D printer, acquiring first output information by comparing a first frame of the video and a second frame subsequent to the first frame, acquiring second output information by extracting output layer-specific trace information from a G-code of the product being output acquired from the 3D printer, and acquiring quality information of the product being output on the basis of the first output information and the second output information.

18 Claims, 5 Drawing Sheets

(56) References Cited

U.S. PATENT DOCUMENTS

2017/0015062 A1    1/2017  Kim et al.
2019/0084240 A1*  3/2019  Ward, Jr. .............. B29C 64/393

FOREIGN PATENT DOCUMENTS

| KR | 10-2017-0089143 A | 8/2017 |
|----|-------------------|--------|
| KR | 10-1777818 B1 | 9/2017 |

* cited by examiner

APPARATUS AND METHOD FOR MANAGING THREE-DIMENSIONAL PRINTING

CROSS-REFERENCE TO RELATED APPLICATION

This application claims priority to Korean Patent Application No. 10-2018-0051076, filed on May 3, 2018 in the Korean Intellectual Property Office (KIPO), the entire content of which is hereby incorporated by reference.

BACKGROUND

1. Technical Field

Example embodiments of the present invention relate to an apparatus and a method for managing three dimensional (3D) printing, and more specifically, to an apparatus and method for managing 3D printing to be suitable for personalized production, such as a small quantity batch production, through intellectualization with G-code.

2. Description of Related Art 3D printing denotes a technology for outputting a 3D object on the basis of a 3D drawing or specific information. 3D printing processes may include a number of processes, but may be roughly classified into estimation, output quality monitoring, and transfer of an output object. Each process is as follows.

Estimation is a process of making an estimate for an output object of 3D printing and may have a strong influence on customers' orders of products. This may be determined according to equipment, output time, materials, shapes, etc., but it is difficult to make an estimate for a product which has characteristics distinguished from existing products due to recent diversification of products.

Output quality monitoring is a process of comparing designed quality requested by a customer and quality of an output result and may be necessarily demanded before the product is transferred to the customer. This may be generally carried out after the output is completely finished. However, when a product is faulty, it is necessary to output the product again from the beginning such that costs may be excessive and time may be wasted for the re-output.

Transfer of an output object is a process of transferring the completed output product from a 3D printer to a desired position and may be required when a plurality of products are continuously output. When an automated robot and the like is used, a gripping position and method may be determined according to a product, and output products may be transferred accordingly. However, when output products have different shapes and the like due to diversification of products, it is difficult to apply different gripping positions and methods according to products.

With the recent popularization of 3D printing, the aforementioned problems are being revealed. To overcome the problems, automation and intellectualization of 3D printing processes are continuously being researched.

SUMMARY

Accordingly, example embodiments of the present invention are provided to substantially obviate one or more problems due to limitations and disadvantages of the related art.

Example embodiments of the present invention provide a method of managing three-dimensional (3D) printing by using G-code.

Example embodiments of the present invention also provide an apparatus for managing 3D printing by using G-code.

In some example embodiments, a method of managing 3D printing includes: receiving a video of a product being output from a 3D printer, acquiring first output information by comparing a first frame of the video and a second frame subsequent to the first frame; acquiring second output information by extracting output layer-specific trace information from a G-code of the product being output acquired from the 3D printer and acquiring quality information of the product being output on the basis of the first output information and the second output information.

The method may further include stopping output of the product when quality information satisfies a condition of fault.

The acquiring of the first output information by comparing the first frame of the video and the second frame subsequent to the first frame may include acquiring first output information by calculating an area change rate of the product being output with respect to a heating bed between a first frame and a second frame of a video looking down from an upper end of the 3D printer on the product being output.

The acquiring of the second output information by extracting the output layer-specific trace information from the G-code of the product being output may include: calculating an area ratio of a first layer of the product being output to the heating bed on the basis of the G-code; calculating the area ratio of a second layer, which is subsequent to the first layer, of the product being output to the heating bed on the basis of the G-code; and acquiring second output information by calculating the area change rate on the basis of the area ratio of the first layer and the area ratio of the second layer.

The acquiring of the first output information by comparing the first frame of the video and the second frame subsequent to the first frame may include acquiring first output information by calculating a height change rate of the product being output between a first frame and a second frame of a video showing a side view of the product being output.

The acquiring of the second output information by extracting the output layer-specific trace information from the G-code of the product being output may include: calculating, on the basis of the G-code, first height information of the product being output as a first layer is stacked; calculating, on the basis of the G-code, second height information of the product being output as a second layer subsequent to the first layer is stacked; and acquiring second output information by calculating the height change rate on the basis of the first height information and the second height information.

The method may further include: generating an estimation model through machine learning by using, as training data, characteristic information of a sample product and price information of the sample product resulting from an actual process; extracting characteristic information of the product from the G-code; and generating estimation information of the product from the characteristic information of the product on the basis of the estimation model.

The method may further include: generating a gripping prediction model for at least one of vacuum suction and gripping points of a gripper through machine learning by using, as training data, characteristic information of a sample product and transfer information of the sample product in an actual process; extracting characteristic information of the product from the G-code; and generating transfer information of the product from the characteristic information of the product on the basis of the gripping prediction model.

The method may further include, when a product identical to the product being output is output again from the 3D printer, determining at least one of durability of the 3D printer and status of abnormality of the 3D printer on the basis of the quality information of the product being output and quality information of the identical product which is output again.

The method may further include, when a product identical to the product being output is output from another 3D printer, generating comparison information regarding at least one of performance and condition between the 3D printer and the other 3D printer on the basis of the quality information of the product being output and quality information of the identical product which is output from the other 3D printer.

In other example embodiments, an apparatus for managing 3D printing includes: a processor, and a memory configured to store at least one command executed by the processor. The at least one command is executed to: receive a video of a product being output from a 3D printer, acquire first output information by comparing a first frame of the video and a second frame subsequent to the first frame; acquire second output information by extracting output layer-specific trace information from a G-code of the product being output acquired from the 3D printer, and acquire quality information of the product being output on the basis of the first output information and the second output information.

The at least one command may be executed to stop output of the product when quality information satisfies a condition of fault.

The at least one command may be executed to acquire first output information by calculating the area change rate of the product being output with respect to a heating bed between a first frame and a second frame of a video looking down from an upper end of the 3D printer on the product being output.

The at least one command may be executed to: calculate the area ratio of a first layer of the product being output to the heating bed on the basis of the G-code; calculate the area ratio of a second layer, which is subsequent to the first layer, of the product being output to the heating bed on the basis of the G-code; and acquire second output information by calculating the area change rate on the basis of the area ratio of the first layer and the area ratio of the second layer.

The at least one command may be executed to acquire first output information by calculating the height change rate of the product being output between a first frame and a second frame of a video showing a side view of the product being output.

The at least one command may be executed to: calculate, on the basis of the G-code, first height information of the product being output as a first layer is stacked; calculate, on the basis of the G-code, second height information of the product being output as a second layer subsequent to the first layer is stacked; and acquire second output information by calculating the height change rate on the basis of the first height information and the second height information.

The at least one command may be executed to: generate an estimation model through machine learning by using, as training data, characteristic information of a sample product and price information of the sample product resulting from an actual process; extract characteristic information of the product from the G-code; and generate estimation information of the product from the characteristic information of the product on the basis of the estimation model.

The at least one command may be executed to: generate a gripping prediction model for at least one of vacuum suction and gripping points of the gripper through machine learning by using, as training data, characteristic information of a sample product and transfer information of the sample product in an actual process; extract characteristic information of the product from the G-code; and generate transfer information of the product from the characteristic information of the product on the basis of the gripping prediction model.

The at least one command may be executed to, when a product identical to the product being output is output again from the 3D printer, determine at least one of durability of the 3D printer and status of abnormality of the 3D printer on the basis of the quality information of the product being output and quality information of the identical product which is output again.

The at least one command may be executed to, when a product identical to the product being output is output from another 3D printer, generate comparison information regarding at least one of performance and condition between the 3D printer and the other 3D printer on the basis of the quality information of the product being output and quality information of the identical product which is output from the other 3D printer.

BRIEF DESCRIPTION OF DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In description of the present invention, a G-code may denote data of a product for performing three-dimensional (3D) printing, and a 3D printer may receive and convert raw design data of a product into the G-code to perform 3D printing or may receive the G-code rather than raw data to perform 3D printing.

Hereinafter, exemplary embodiments of the present invention will be described in detail with reference to the accompanying drawings.

Figure 1:
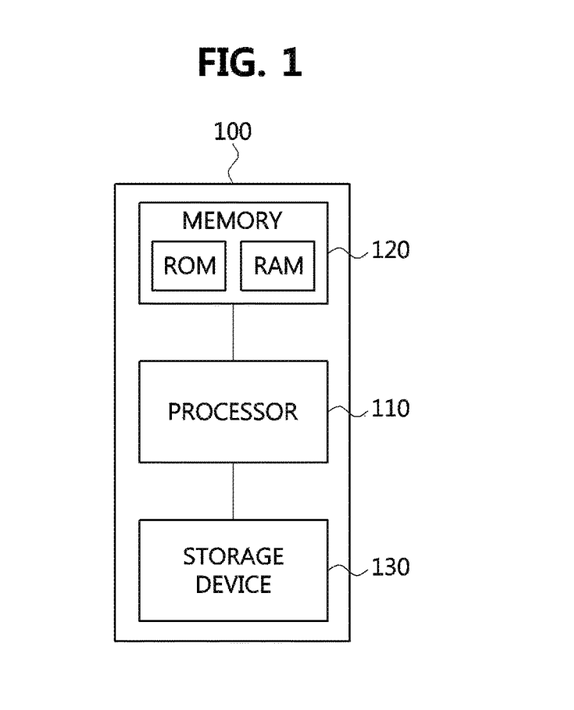
FIG. 1 is a block diagram of an apparatus for managing three-dimensional (3D) printing according to an example embodiment of the present invention.

FIG. 1 is a block diagram of an apparatus for managing 3D printing according to an example embodiment of the present invention.

Referring to FIG. 1, an apparatus 100 for managing 3D printing according to an example embodiment of the present invention may include at least one processor 110, a memory 120, and a storage device 130.

Here, the apparatus 100 for managing 3D printing may be connected to at least one 3D printer including at least one image capturing device, and the connection may be made via wired or wireless communication but is not limited thereto.

The processor 110 may execute a program command stored in the memory 120 and/or the storage device 130. The processor 110 may denote a central processing unit (CPU), a graphics processing unit (GPU), or a processor dedicated to perform methods according to example embodiments of the present invention. The memory 120 and the storage device 130 may be configured as a volatile storage medium and/or a non-volatile storage medium. For example, the memory 120 may be configured as a read only memory (ROM) and/or a random access memory (RAM).

The memory 120 may store at least one command executed through the processor 110. The at least one command may include a command to receive a video of a product being output from the 3D printer, a command to acquire first output information by comparing a first frame of the video and a second frame subsequent to the first frame, a command to acquire second output information by extracting output layer-specific trace information from a G-code of the product being output acquired from the 3D printer, and a command to acquire quality information of the product being output on the basis of the first output information and second output information.

The at least one command may also include at least one of a command to acquire first output information by calculating an area change rate of the product being output with respect to a heating bed between a first frame and a second frame of a video looking down from an upper end of the 3D printer on the product being output, a command to calculate an area ratio of a first layer of the product being output to the heating bed on the basis of the G-code, a command to calculate the area ratio of a second layer, which is subsequent to the first layer, of the product being output to the heating bed on the basis of the G-code, and a command to acquire second output information by calculating the area change rate on the basis of the area ratio of the first layer and the area ratio of the second layer.

The at least one command may also include at least one of a command to acquire first output information by calculating a height change rate of the product being output between a first frame and a second frame of a video showing a side view of the product being output, a command to calculate, on the basis of the G-code, first height information of the product being output as the first layer is stacked, a command to calculate, on the basis of the G-code, second height information of the product being output as the second layer subsequent to the first layer is stacked, and a command to acquire second output information by calculating the height change rate on the basis of the first height information and the second height information.

The at least one command may also include a command to generate an estimation model through machine learning by using, as training data, characteristic information of a sample product and price information of the sample product resulting from an actual process, a command to extract characteristic information of the product from the G-code, and a command to generate estimation information of the product from the characteristic information of the product on the basis of the estimation model.

The at least one command may also include a command to generate a gripping prediction model for at least one of vacuum suction and gripping points of a gripper through machine learning by using, as training data, characteristic information of a sample product and transfer information of the sample product in an actual process, a command to extract characteristic information of the product from the G-code, and a command to generate transfer information of the product from the characteristic information of the product on the basis of the gripping prediction model.

The at least one command may also include at least one of a command to, when a product identical to the product being output is output again from the 3D printer, determine at least one of durability of the 3D printer and status of abnormality of the 3D printer on the basis of the quality information of the product being output and quality information of the identical product which is output again, a command to, when a product identical to the product being output is output from another 3D printer, generate comparison information regarding at least one of performance and condition between the 3D printer and the other 3D printer on the basis of the quality information of the product being output and quality information of the identical product which is output from the other 3D printer, and a command to stop output of the product when quality information satisfies a condition of fault.

Operation of the apparatus 100 for managing 3D printing according to an example embodiment of the present invention will be described in further detail below.

The processor 110 of the apparatus 100 for managing 3D printing according to an example embodiment of the present invention may perform the following three operations. In the first operation, an estimate may be generated on the basis of the G-code of a product that a client wants to output. In the second operation, output quality of the product being output may be monitored in real time on the basis of the G-code. In the third operation, after output of the product is finished, the completed output product may be vacuum-sucked or gripped by an automated robot equipped with an end-effector and transferred from the 3D printer to a desired position for output of a following product. Each operation will be described in detail below.

In the first operation, an estimate may be generated on the basis of the G-code of a product that a client wants to output. Since an output time of 3D printing is longer than that of 2D printing, the output time may be an important factor for calculating a printing price. Therefore, according to related art, an estimate of a product is derived from only an output time included in the G-code. However, the price of 3D printing may be affected by a material, a shape, etc. in addition to an output time, and an actual charged price may differ from an estimate after the corresponding product is output.

Therefore, the apparatus 100 for managing 3D printing according to an example embodiment of the present invention may show higher accuracy than an existing estimation method by extracting characteristic information of a product, which may affect price estimation, from the G-code and using the extracted characteristic information. In other words, the apparatus 100 for managing 3D printing according to an example embodiment of the present invention may extract characteristic information, such as an output time, a shape, a material, etc., which affects price estimation from the G-code of a product requested by a client, and store the extracted characteristic information in a database.

Also, the apparatus 100 for managing 3D printing according to an example embodiment of the present invention may store characteristic information and final cost information of sample products (including products which have been output) in the database, and perform machine learning by using the characteristic information and the final cost information as training data. The apparatus 100 for managing 3D printing may generate an estimation model through machine learning, and make an accurate estimate on the basis of the estimation model from the G-code of a product for which an output request has been newly received from a client.

Since the apparatus 100 for managing 3D printing may generate an estimation model through machine learning, it is even possible to generate an estimate of a product which has not yet been output more accurately than an existing estimation method with reference to an estimate of a product which has similar characteristic information and has been output already. Also, it is possible to continuously improve performance of the estimation model by adding information of additionally output products as training data. In other words, the apparatus 100 for managing 3D printing may provide an intellectualized estimation method of a client.

In the second operation, output quality of the product being output may be monitored in real time on the basis of the G-code. Output quality monitoring which is used in existing 3D printing is generally performed after output is complete. Accordingly, when a product is determined to be faulty, it is necessary to output the product again from the beginning. Since 3D printing requires a long output time as mentioned above, wasted time is a considerable problem in this case.

Therefore, when the 3D printer including an image capturing device performs 3D printing, the apparatus 100 for managing 3D printing according to an example embodiment of the present invention may monitor output quality of a product being output in real time by comparatively analyzing a video and the G-code of the product being output. Accordingly, when a substandard part is output during output of a product, the apparatus 100 for managing 3D printing may stop output by determining the product to be faulty and may immediately perform re-output. Therefore, the apparatus 100 for managing 3D printing may reduce wasted time caused by post-determination of fault. Real-time output quality monitoring will be described in detail below with reference to FIGS. 2 and 3.

Also, the apparatus 100 for managing 3D printing according to an example embodiment of the present invention may determine durability of equipment or the 3D printer or status of abnormality of the equipment or the 3D printer by using output quality monitoring results, and compare performance or condition thereof with that of another 3D printer. This will be described in detail below with reference to FIGS. 4 and 5.

In the third operation, when output of the product is finished, a robot equipped with an end-effector may pick up and transfer the completed output product from the 3D printer to a desired position for output of a following product. Like an existing manufacturing process, it is necessary to transfer a completed output product to a specific position for continuous 3D printing. According to related art, an automated robot and the like may be used to transfer an output object of the 3D printer to a specific position in a factory on the basis of vision information of the output object. In such an existing method, when vacuum suction or gripping points are determined in advance according to a shape and characteristics of a product, the product is picked up and transferred by using information on an external shape and a position of an output object as vision information. For this reason, there is a problem in that it is not possible to consider a material, the center of gravity, or the like of a new product to transfer the product.

The apparatus 100 for managing 3D printing according to an example embodiment of the present invention may extract characteristic information of an output object, such as a shape, a material, the center of gravity, etc., on the basis of the G-code of a new product, and transfer the output object on the basis of the characteristic information after determining at least one of vacuum suction and gripping points of the gripper. In other words, the apparatus 100 for managing 3D printing according to an example embodiment of the present invention may determine a method of picking up a product, such as vacuum suction, gripping points, etc. of the gripper, for transfer on the basis of characteristic information of the product extracted from the G-code, and store the determined method in the database. Here, vacuum suction and gripping points of the gripper may include the strength and position of gripping.

Also, the apparatus 100 for managing 3D printing according to an example embodiment of the present invention may store characteristic information of sample products (including products which have been output already) and information on successful gripping methods for the sample products in the database, and perform machine learning by using the characteristic information and the successful gripping methods as training data. The apparatus 100 for managing 3D printing according to an example embodiment of the present invention may generate a gripping prediction model for the at least one of vacuum suction and gripping points of the gripper through machine learning and generate accurate transfer information from the G-code of a product for which an output request has been newly received from a client on the basis of the gripping prediction model.

Figure 2:
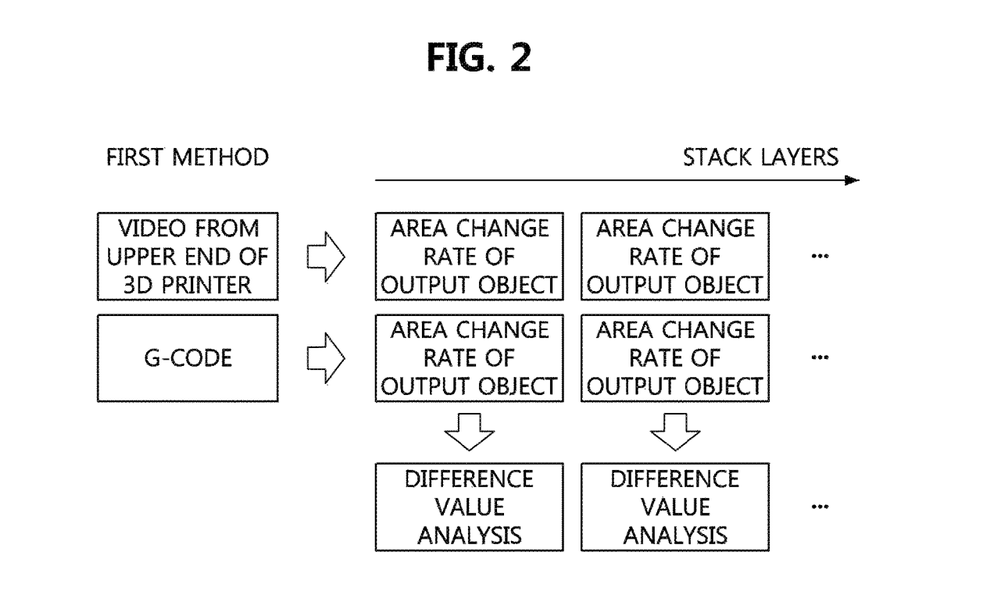
FIG. 2 is a diagram illustrating a first method of output quality monitoring according to an example embodiment of the present invention.

FIG. 2 is a diagram illustrating a first method of output quality monitoring according to an example embodiment of the present invention.

Referring to FIG. 2, a method in which the apparatus 100 for managing 3D printing according to an example embodiment of the present invention performs output quality monitoring may include at least one of a first method based on a video captured at an upper end of a 3D printer and a second method based on a video captured from a side of the 3D printer.

First, the first method in which the apparatus 100 for managing 3D printing according to an example embodiment of the present invention performs output quality monitoring is as follows.

The apparatus 100 for managing 3D printing may calculate an area change rate of an output object on the basis of a video looking down from an upper end of the 3D printer on the product being output. Here, the area change rate of the output object may be calculated by using a ratio of an area of the output object to an area of a heating bed, that is, calculated as a change rate of the area ratio between adjacent frames of the video. As layers are stacked, the area change rate may be continuously calculated such that first output information may be generated on the basis of the video.

Also, the apparatus 100 for managing 3D printing may extract output trace information from a G-code and calculate the area change rate of an output object on the basis of the output trace information. In other words, as the layers are stacked, the apparatus 100 for managing 3D printing may calculate layer-specific area ratios of an output object to the heating bed of the 3D printer. More particularly, the apparatus 100 for managing 3D printing may calculate a first area ratio of the output object in a first layer to the heating bed, calculate a second area ratio of the output object in a second layer to the heating bed, which is a subsequent layer to the first layer, and generate second output information on the basis of the G-code by calculating the area change ratio between adjacent layers on the basis of the first area ratio and the second area ratio. Here, the apparatus 100 for managing 3D printing may construct a normalization map on the basis of related data as shown in FIG. 2.

The apparatus 100 for managing 3D printing may calculate a difference value by standardizing and comparatively analyzing the first output information based on the video and the second output information based on the G-code, and may determine that a fault has occurred in the product being output when the calculated difference value exceeds a certain value or a fault reference value. In other words, since the apparatus 100 for managing 3D printing may determine whether a fault has occurred in each layer, it is possible to reduce wasted time by stopping output when a fault occurs.

Figure 3:
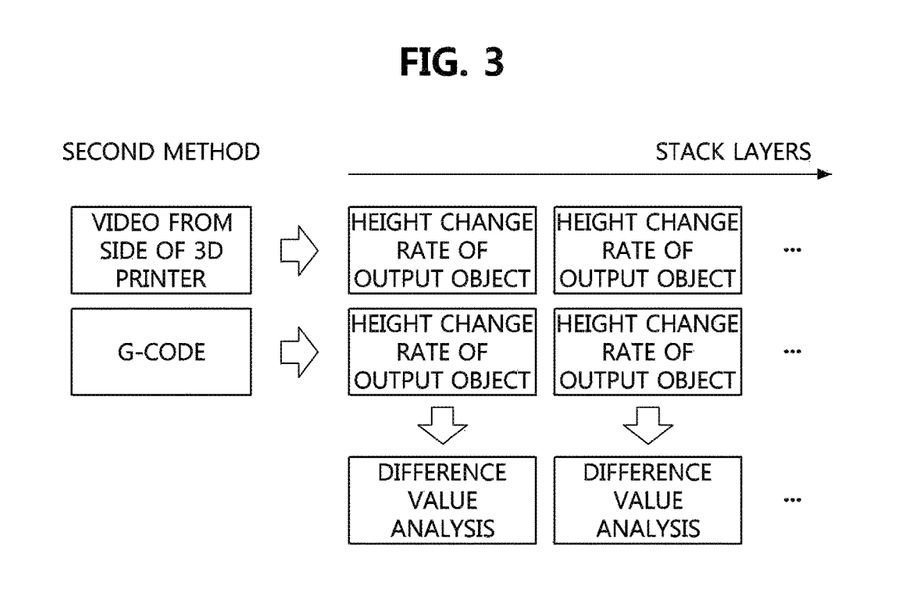
FIG. 3 is a diagram illustrating a second method of output quality monitoring according to an example embodiment of the present invention.

FIG. 3 is a diagram illustrating a second method of output quality monitoring according to an example embodiment of the present invention.

The second method in which the apparatus 100 for managing 3D printing according to an example embodiment of the present invention performs output quality monitoring is as follows.

The apparatus 100 for managing 3D printing may calculate a height change rate of the output object on the basis of a video obtained by capturing a side of the product being output from a side of a 3D printer. Here, the height change rate of the output object may be calculated as a change rate between adjacent frames of the video on the basis of the heating bed. As layers are stacked, an area change rate may be continuously calculated such that first output information may be generated on the basis of the video.

Also, the apparatus 100 for managing 3D printing may extract output trace information from a G-code and calculate the height change rate of the output object on the basis of the output trace information. In other words, as the layers are stacked, the apparatus 100 for managing 3D printing may calculate layer-specific heights of the output object on the basis of the heating bed of the 3D printer. More particularly, the apparatus 100 for managing 3D printing may calculate a first height of the output object in the first layer on the basis of the heating bed, calculate a second height of the output object in the second layer, which is a subsequent layer to the first layer, on the basis of the heating bed, and generate second output information on the basis of the G-code by calculating a height change ratio between adjacent layers on the basis of the first height and the second height. Here, the apparatus 100 for managing 3D printing may construct a normalization map on the basis of related data as shown in FIG. 3.

The apparatus 100 for managing 3D printing may calculate a difference value by standardizing and comparatively analyzing the first output information based on the video and the second output information based on the G-code, and may determine that a fault has occurred in the product being output when the calculated difference value exceeds a certain value. In other words, since the apparatus 100 for managing 3D printing may determine whether a fault has occurred in each layer, it is possible to reduce wasted time by stopping output when a fault occurs.

The apparatus 100 for managing 3D printing according to an example embodiment of the present invention may use the above-described first or second method or improve accuracy by using the first and second method together. In any case, a video is used, and the used video is not limited to a top-down view or a side view. In an output quality monitoring method, any video obtained by capturing a product being output may be used.

Also, when the apparatus 100 for managing 3D printing according to an example embodiment of the present invention monitors output quality by using at least one of the first method and the second method, it is possible to record layer-specific lamination videos. Therefore, it is possible to ensure layer-specific quality, and make a report to a client or a 3D printer manager on-line and the like in real time at a point in time that a fault or an error occurs.

Figure 4:
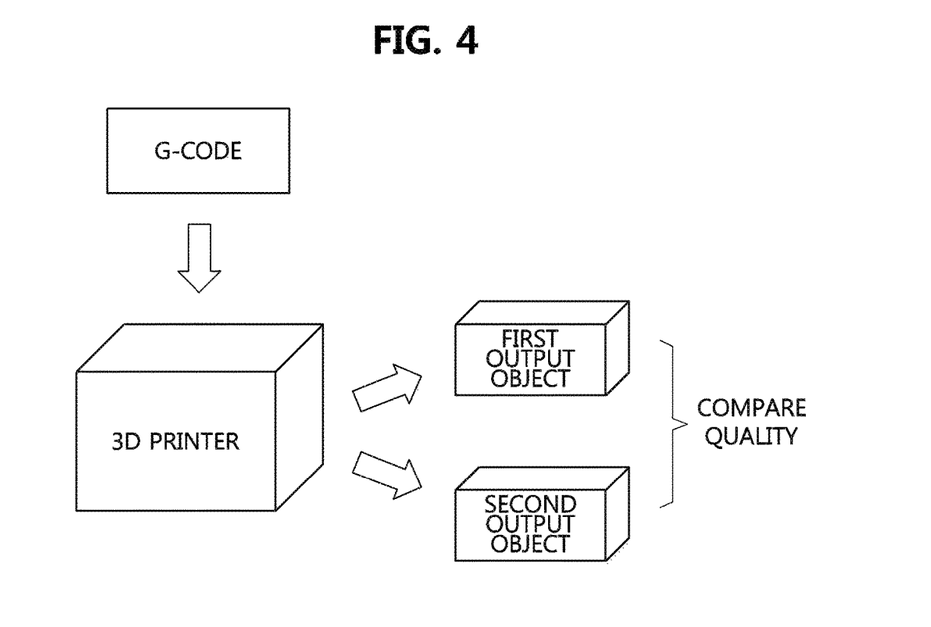
FIG. 4 is a diagram illustrating a method of determining durability of a 3D printer and status of abnormality of the 3D printer according to an example embodiment of the present invention.

FIG. 4 is a diagram illustrating a method of determining durability of a 3D printer and status of abnormality of the 3D printer according to an example embodiment of the present invention.

Referring to FIG. 4, the apparatus 100 for managing 3D printing according to an example embodiment of the present invention may determine at least one of durability of a specific 3D printer and status of abnormality of the specific 3D printer by comparing a first output object and a second output object of the specific 3D printer based on one G-code.

In other words, the apparatus 100 for managing 3D printing may determine current durability of the 3D printer and status of abnormality of the 3D printer by comparing quality of a first output object which has been output from the 3D printer on the basis of the G-code of a specific product and a second output object which is output from the same 3D printer on the basis of the same G-code.

This may be continuously performed when the same product is output. When sufficient data is accumulated, it may be possible to analyze durability and a condition-based maintenance time point of printer equipment according to aging, the frequency of abnormality, and the magnitude of abnormality of the 3D printer, not by using the same product but by using a product group sharing similar characteristics. Also, according to the results, it is possible to identify a change in ambient temperature, a condition of a nozzle, and the like and appropriately manage the 3D printer.

A method for the apparatus 100 to determine durability of the 3D printer and status of abnormality of the 3D printer may be an advanced technology than reactive maintenance and preventive maintenance, and may be used for prognostics and health management (PHM).

Figure 5:
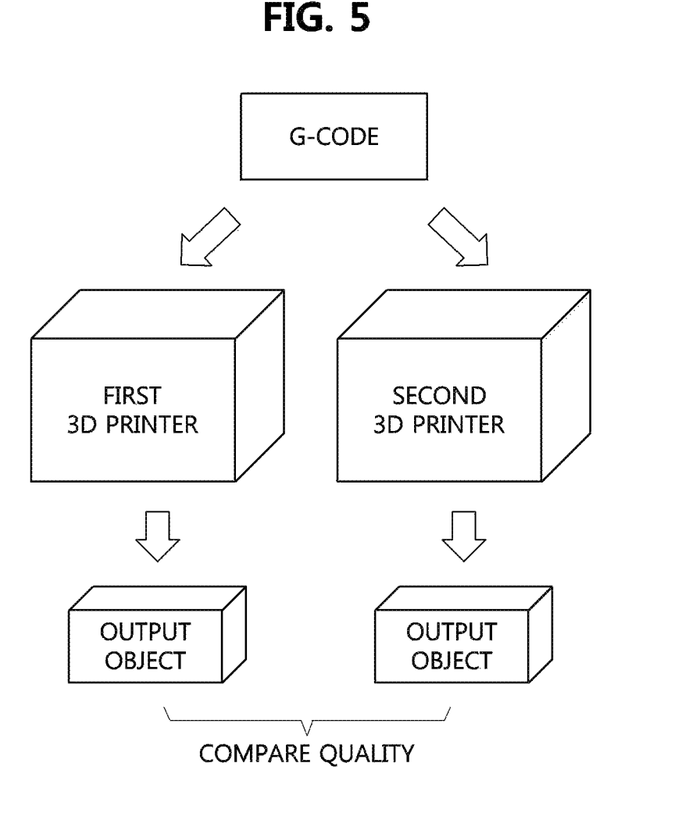
FIG. 5 is a diagram illustrating a method of generating performance or condition comparison information between a printer 3D and another 3D printer according to an example embodiment of the present invention.

FIG. 5 is a diagram illustrating a method of generating performance or condition comparison information between a printer 3D and another 3D printer according to an example embodiment of the present invention.

Referring to FIG. 5, the apparatus 100 for managing 3D printing according to an example embodiment of the present invention may be connected to two or more 3D printers, and may compare at least one of performance and condition between a first 3D printer and a second 3D printer by comparing objects output from the first and second 3D printers on the basis of one G-code.

In other words, the apparatus 100 for managing 3D printing may analyze a difference (common difference) between output objects on the basis of quality information of an object output from the first 3D printer and quality information of an object output from the second 3D printer on the basis of the G-code of a specific product, and may generate comparison information regarding at least one of performance and condition accordingly.

Therefore, when the apparatus 100 for managing 3D printing is connected to a plurality of 3D printers, the apparatus 100 for managing 3D printing may provide comparison information regarding the at least one of performance and condition to a client or a manager of the 3D printers so that management and output of the 3D printers may be appropriately performed.

Figure 6:
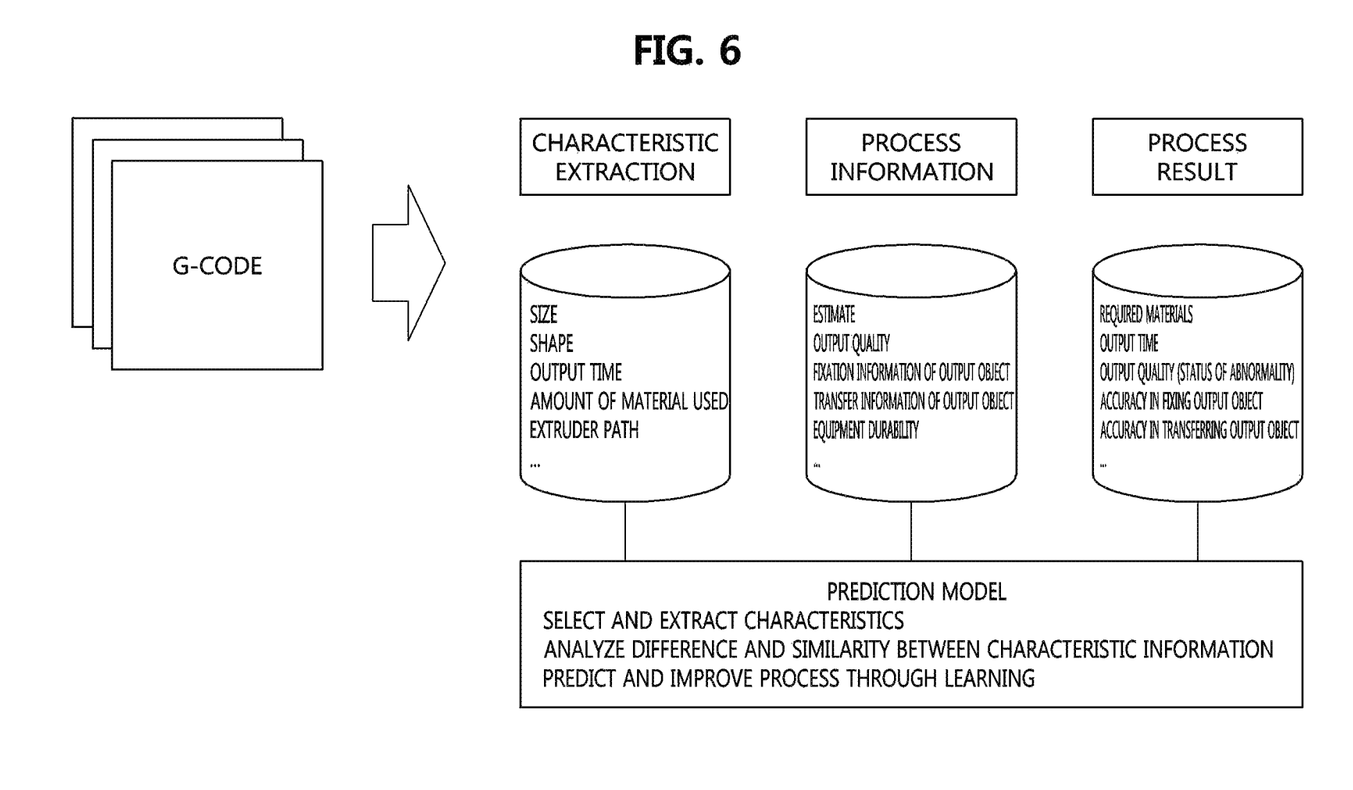
FIG. 6 is a conceptual diagram of a method of generating a prediction model according to an example embodiment of the present invention.

FIG. 6 is a conceptual diagram of a method of generating a prediction model according to an example embodiment of the present invention.

Referring to FIG. 6, the apparatus 100 for managing 3D printing according to an example embodiment of the present invention may extract characteristic information including a size, a shape, an output time, the amount of material used, an extruder path, etc. from a G-code of a product, and may generate a prediction model by using the extracted characteristic information, process information, such as an estimate made on the basis of the characteristic information, output quality, fixation information of an output object, transfer information of the output object, equipment durability, etc., and process results, such as required materials, output time, output quality, accuracy in fixing the output object, accuracy in transferring the output object, etc.

Here, the prediction model may include an estimation model and a gripping prediction model for at least one of vacuum suction and gripping points of a gripper and may be generated through machine learning by using at least one kind of the aforementioned data as training data. When there is a request for a new product, it is possible to generate estimation information, vacuum suction information, gripping point information, etc. on the basis of the generated prediction model, and to continuously improve accuracy through machine learning by using an output resulting from the generated information as training data. Also, the prediction model is generated through machine learning such that estimation information, vacuum suction information, gripping point information, etc. may be generated on the basis of a history of a product which is not identical to the product but has similar characteristics.

Information shown in FIG. 6 is an example, and the scope of the present invention is not limited thereto.

Figure 7:
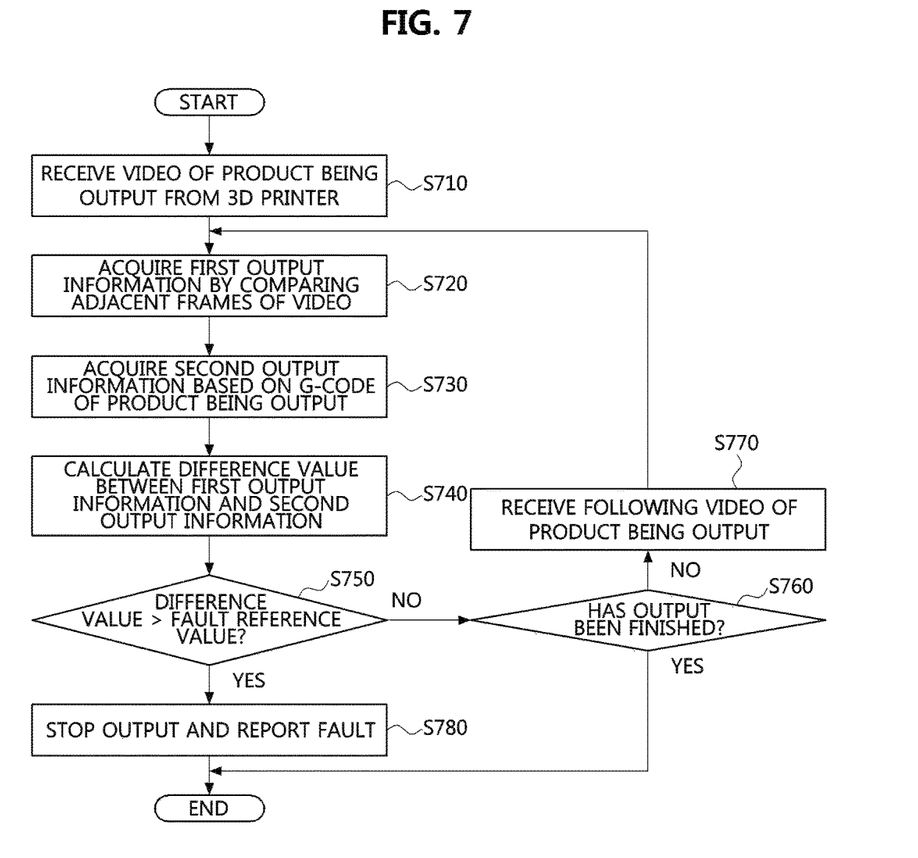
FIG. 7 is a flowchart illustrating an output quality monitoring method of an apparatus for managing 3D printing according to an example embodiment of the present invention.

FIG. 7 is a flowchart illustrating an output quality monitoring method of an apparatus for managing 3D printing according to an example embodiment of the present invention.

Referring to FIG. 7, the apparatus 100 for managing 3D printing according to an example embodiment of the present invention may receive a video of a product which is being output from a 3D printer (S710) and acquire first output information by comparing adjacent frames of the received video (S720). Here, the first output information may denote an area change rate of an output object with respect to a heating bed or a height change rate of the output object on the basis of the heating bed.

The apparatus 100 for managing 3D printing according to an example embodiment of the present invention may acquire second output information on the basis of a G-code of the product being output (S730). Here, the second output information may denote layer-specific area change rates of the output object with respect to the heating bed on the basis of output trace information extracted from the G-code or denote the height change rate of the output object on the basis of the heating bed.

Also, the apparatus 100 for managing 3D printing according to an example embodiment of the present invention may calculate a difference value between the first output information and the second output information (8740). In other words, the apparatus 100 for managing 3D printing may standardize and comparatively analyze the first output information and the second output information and use a normalized map for comparative analysis.

The apparatus 100 for managing 3D printing may determine whether the difference value exceeds a fault reference value (S750). The apparatus 100 for managing 3D printing may determine whether output of the product has been finished (S760) when the difference value does not exceed the fault reference value, and may finish operation thereof when output of the product has been finished. On the other hand, when output of the product has not been finished, a following video of the product being output may be received (S770), and the above-described process may be performed again.

However, when the difference value exceeds the fault reference value, the apparatus 100 for managing 3D printing may stop output and report occurrence of a fault to a client or a 3D printer manager (S780).

According to example embodiments of the present invention, it is possible to provide an estimate of a new product having characteristics similar to those of an existing product.

According to example embodiments of the present invention, when a fault is found in a product through real-time output quality monitoring, it is possible to output the product again without waiting for output of the faulty product to finish.

According to example embodiments of the present invention, even when various products are continuously output, it is possible to effectively grip the products according to shapes and the like of the products.

While the example embodiments of the present invention and their advantages have been described in detail, it should be understood that various changes, substitutions and alterations may be made herein without departing from the scope of the invention.

The methods according to the embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While certain aspects of the present disclosure have been described in the context of an apparatus, it may also represent an explanation according to a corresponding method, wherein the components or apparatuses correspond to the respective steps of the method and the respective features of the steps. Similarly, aspects described in the context of a method may also be represented by features of the corresponding components, items or apparatuses. Some or all of the method steps may be performed by a microprocessor, a programmable computer or a hardware apparatus such as an electronic circuit. In some embodiments, one or more of the most important method steps may beperformed by such the apparatus.

In the embodiments, a programmable logic device (e.g., a field programmable gate array (FPGA)) may be used to perform some or all of the functions of the methods described herein. In the embodiments, the FPGA may operate in conjunction with a microprocessor to perform one of the methods described herein. In general, some of the methods are preferably performed by some hardware device.

While the embodiments of the present disclosure and their advantages have been described in detail, it should be understood that various changes, substitutions and alterations may be made herein without departing from the scope of the present disclosure.

What is claimed is:

1. A method of managing three-dimensional (3D) printing, the method comprising:
   receiving a video of a product being output from a 3D printer;
   acquiring first output information by comparing a first frame of the video and a second frame subsequent to the first frame;
   acquiring second output information by extracting output layer-specific trace information from a G-code of the product being output acquired from the 3D printer; and
   acquiring quality information of the product being output based on the first output information and the second output information,
   wherein the acquiring of the first output information by comparing the first frame of the video and the second frame subsequent to the first frame comprises acquiring first output information by calculating an area change rate of the product being output with respect to a heating bed between a first frame and a second frame of a video looking down from an upper end of the 3D printer on the product being output.

2. The method of claim 1, further comprising stopping output of the product when quality information satisfies a condition of fault.

3. The method of claim 1, wherein the acquiring of the second output information by extracting the output layer-specific trace information from the G-code of the product being output comprises:
   calculating an area ratio of a first layer of the product being output to the heating bed based on the G-code;
   calculating an area ratio of a second layer, which is subsequent to the first layer, of the product being output to the heating bed based on the G-code; and
   acquiring second output information by calculating an area change rate based on the area ratio of the first layer and the area ratio of the second layer.

4. The method of claim 1, wherein the acquiring of the first output information by comparing the first frame of the video and the second frame subsequent to the first frame further comprises calculating a height change rate of the product being output between a first frame and a second frame of a video showing a side view of the product being output to acquire the first output information.

5. The method of claim 4, wherein the acquiring of the second output information by extracting the output layer-specific trace information from the G-code of the product being output comprises:

calculating, based on the G-code, first height information of the product being output as a first layer is stacked;

calculating, based on the G-code, second height information of the product being output as a second layer subsequent to the first layer is stacked; and acquiring second output information by calculating a height change rate based on the first height information and the second height information.

6. The method of claim 1, further comprising:

generating an estimation model through machine learning by using, as training data, characteristic information of a sample product and price information of the sample product resulting from an actual process;

extracting characteristic information of the product from the G-code; and generating estimation information of the product from the characteristic information of the product based on the estimation model.

7. The method of claim 1, further comprising:

generating a gripping prediction model for at least one of vacuum suction and gripping points of a gripper through machine learning by using, as training data, characteristic information of a sample product and transfer information of the sample product in an actual process;

extracting characteristic information of the product from the G-code; and generating transfer information of the product from the characteristic information of the product based on the gripping prediction model.

8. The method of claim 1, further comprising, when a product identical to the product being output is output again from the 3D printer, determining at least one of durability of the 3D printer and status of abnormality of the 3D printer based on the quality information of the product being output and quality information of the identical product which is output again.

9. The method of claim 1, further comprising, when a product identical to the product being output is output from another 3D printer, generating comparison information regarding at least one of performance and condition between the 3D printer and the other 3D printer based on the quality information of the product being output and quality information of the identical product which is output from the other 3D printer.

10. An apparatus connected to at least one three-dimensional (3D) printer including at least one image capturing device and managing 3D printing, the apparatus comprising:

a processor; and a memory configured to store at least one command executed by the processor, wherein the at least one command is executed to:

receive a video of a product being output from the 3D printer;

acquire first output information by comparing a first frame of the video and a second frame subsequent to the first frame;

acquire second output information by extracting output layer-specific trace information from a G-code of the product being output acquired from the 3D printer;

acquire quality information of the product being output based on the first output information and the second output information; and acquire first output information by calculating an area change rate of the product being output with respect to a heating bed between a first frame and a second frame of a video looking down from an upper end of the 3D Printer on the product being output.

11. The apparatus of claim 10, wherein the at least one command is executed to stop output of the product when quality information satisfies a condition of fault.

12. The apparatus of claim 10, wherein the at least one command is executed to:

calculate an area ratio of a first layer of the product being output to the heating bed based on the G-code;

calculate an area ratio of a second layer, which is subsequent to the first layer, of the product being output to the heating bed based on the G-code; and acquire second output information by calculating an area change rate based on the area ratio of the first layer and the area ratio of the second layer.

13. The apparatus of claim 10, wherein the at least one command is executed to acquire first output information by further calculating a height change rate of the product being output between a first frame and a second frame of a video showing a side view of the product being output.

14. The apparatus of claim 13, wherein the at least one command is executed to:

calculate, based on the G-code, first height information of the product being output as a first layer is stacked;

calculate, based on the G-code, second height information of the product being output as a second layer subsequent to the first layer is stacked; and acquire second output information by calculating a height change rate based on the first height information and the second height information.

15. The apparatus of claim 10, wherein the at least one command is executed to:

generate an estimation model through machine learning by using, as training data, characteristic information of a sample product and price information of the sample product resulting from an actual process;

extract characteristic information of the product from the G-code; and generate estimation information of the product from the characteristic information of the product based on the estimation model.

16. The apparatus of claim 10, wherein the at least one command is executed to:

generate a gripping prediction model for at least one of vacuum suction and gripping points of a gripper through machine learning by using, as training data, characteristic information of a sample product and transfer information of the sample product in an actual process;

extract characteristic information of the product from the G-code; and generate transfer information of the product from the characteristic information of the product based on the gripping prediction model.

17. The apparatus of claim 10, wherein the at least one command is executed to, when a product identical to the product being output is output again from the 3D printer, determine at least one of durability of the 3D printer and status of abnormality of the 3D printer based on the quality information of the product being output and quality information of the identical product which is output again.

18. The apparatus of claim 10, wherein the at least one command is executed to, when a product identical to the product being output is output from another 3D printer, generate comparison information regarding at least one of performance and condition between the 3D printer and the other 3D printer based on the quality information of the product being output and quality information of the identical product which is output from the other 3D printer.

* * * * *